US008315231B2

United States Patent
Pirzada et al.

(10) Patent No.: US 8,315,231 B2
(45) Date of Patent: Nov. 20, 2012

(54) DISCOVERY OF MULTIPLE INTER-NODE LINKS IN WIRELESS MULTI-HOP NETWORKS

(75) Inventors: Asad Amir Pirzada, Rawalpindi (PK); Marius Portmann, Underwood (AU)

(73) Assignee: National ICT Australia Limited, Eveleigh, NSW (AU)

( * ) Notice: Subject to any disclaimer, the term of this patent is extended or adjusted under 35 U.S.C. 154(b) by 50 days.

(21) Appl. No.: 12/513,945

(22) PCT Filed: Nov. 28, 2007

(86) PCT No.: PCT/AU2007/001837
§ 371 (c)(1),
(2), (4) Date: Nov. 19, 2009

(87) PCT Pub. No.: WO2008/064419
PCT Pub. Date: Jun. 5, 2008

(65) Prior Publication Data
US 2010/0097957 A1 Apr. 22, 2010

(30) Foreign Application Priority Data

Nov. 28, 2006 (AU) ................................ 2006906660

(51) Int. Cl.
*H04W 4/00* (2009.01)
(52) U.S. Cl. .................... 370/334; 370/395.31; 370/338
(58) Field of Classification Search .................. None
See application file for complete search history.

(56) References Cited

U.S. PATENT DOCUMENTS

| 6,304,556 | B1 | 10/2001 | Haas |
| 7,002,470 | B1 * | 2/2006 | Miao ........................ 340/539.22 |
| 7,177,295 | B1 * | 2/2007 | Sholander et al. ............ 370/338 |
| 7,260,369 | B2 * | 8/2007 | Feher ............................ 455/133 |
| 7,280,810 | B2 * | 10/2007 | Feher ............................ 455/137 |

(Continued)

FOREIGN PATENT DOCUMENTS

WO  WO 2006/029126  3/2006

OTHER PUBLICATIONS

Atul Adya et al., "A Multi-Radio Unification Protocol for IEEE 802.11 Wireless Networks", 1st International Conference on Boradband Networks, IEEE Computer Society 2004, 12 pages.

(Continued)

*Primary Examiner* — Ayaz Sheikh
*Assistant Examiner* — Faiyazkhan Ghafoerkhan

(57) ABSTRACT

An extension to reactive ad-hoc routing protocols in multi-hop wireless mesh networks. The protocol discovers bi-directional links during route establishment, particularly multiple links between a single pair of nodes. Source and intermediate nodes transmit a route request, at least one of the nodes transmitting the route request on more than one wireless interface. Upon receiving a route request, each node creates at least one reverse link to the node from which the route request was received. The destination and intermediate nodes transmit, via at least one of the reverse links, at least one route reply which enables a node receiving the route reply to identify one or more wireless interfaces of the node transmitting the route reply. Upon receiving a route reply, each node creates at least one forward link to the node from which the route reply was received. Routes may then be established using any discovered bidirectional link.

11 Claims, 2 Drawing Sheets

U.S. PATENT DOCUMENTS

| | | | | |
|---|---|---|---|---|
| 7,327,683 | B2* | 2/2008 | Ogier et al. | 370/236 |
| 7,356,343 | B2* | 4/2008 | Feher | 455/456.1 |
| 7,474,650 | B2* | 1/2009 | O'Neill | 370/349 |
| 7,680,029 | B2* | 3/2010 | Kano et al. | 370/218 |
| 2003/0128658 | A1* | 7/2003 | Walton et al. | 370/208 |
| 2004/0246975 | A1* | 12/2004 | Joshi | 370/395.31 |
| 2005/0111462 | A1* | 5/2005 | Walton et al. | 370/395.4 |
| 2006/0072604 | A1* | 4/2006 | Sutivong et al. | 370/437 |
| 2006/0109926 | A1* | 5/2006 | Jalali et al. | 375/260 |
| 2006/0114850 | A1* | 6/2006 | Avinash | 370/328 |
| 2006/0133273 | A1* | 6/2006 | Julian et al. | 370/230 |
| 2007/0030116 | A1* | 2/2007 | Feher | 340/5.53 |
| 2007/0032220 | A1* | 2/2007 | Feher | 455/404.1 |
| 2007/0032246 | A1* | 2/2007 | Feher | 455/456.1 |
| 2007/0032250 | A1* | 2/2007 | Feher | 455/456.2 |
| 2007/0032266 | A1* | 2/2007 | Feher | 455/553.1 |
| 2007/0070959 | A1* | 3/2007 | Almeroth et al. | 370/338 |
| 2007/0076673 | A1* | 4/2007 | Joshi | 370/338 |
| 2008/0130664 | A1* | 6/2008 | Lee et al. | 370/401 |

OTHER PUBLICATIONS

Asad Amir Pirzada et al., "Performance Comparison of Muli-Path AODV and DSR Protocols in Hybrid Mesh Networks", IEEE 2006, 6 pages.

Asad Amir Pirzada et al., "Hybrid Mesh Ad-hoc On-demand Distance Vector Routing Protocol", www.acorn.net.au/event/ecrworkshop/abstracts.cfm, Oct. 24, 2006, 1 page.

Asad Amir Pirzada et al., "Evaluation of Multi-Radio Extensions to AODV for Wireless Mesh Networks", MobiWac '06, Oct. 2, 2006, pp. 45-51.

* cited by examiner

DISCOVERY OF MULTIPLE INTER-NODE LINKS IN WIRELESS MULTI-HOP NETWORKS

CROSS-REFERENCE TO RELATED APPLICATIONS

The present application claims priority from Australian Provisional Patent Application No 2006906660 filed on 28 Nov. 2006, the content of which is incorporated herein by reference.

TECHNICAL FIELD

The present invention relates to discovering multiple bi-directional links during route establishment in a wireless multi-hop network.

BACKGROUND OF THE INVENTION

Mobile ad-hoc networks (MANET) and wireless mesh networks (WMN) are self-organizing and self-configuring wireless networks, typically implemented with IEEE 802.11 hardware. In conventional wireless LANs, clients communicate with access points via a single-hop wireless link and access points are interconnected via a wired backbone infrastructure. MANETs and WMNs do not rely on such a wired backhaul and implement connectivity via a wireless multi-hop network. Their robustness, self-organizing and self-configuring nature, and the low cost of wide area deployment make them an attractive platform for a wide range of applications, such as public safety and emergency response communications, intelligent transportation systems, or community networks.

Routing protocols are a key component in MANETs and WMNs, providing them with their self-configuration and self-healing capabilities. These routing protocols endeavor to discover routes, traversing multiple hops, in a highly dynamic environment. These protocols can be broadly categorized into two types: reactive and proactive. In reactive routing or on-demand protocols, the routes are established only when required, generally using flooding to disseminate a Route Request packet in the network. In proactive routing protocols the routes are established before they are actually required, using periodical exchanges of connectivity information. Both types of protocols have their individual advantages. Reactive protocols focus on minimizing control packet overhead while the proactive protocols attempt to minimize the route establishment delays.

A significant problem of wireless multi-hop networks is the limited scalability and the degradation of performance with increasing path lengths, i.e. number of hops. This limitation is mainly due to co-channel interference as well as the fact that IEEE 802.11 interfaces do not support full-duplex operation, i.e. simultaneous transmission and reception of data. One approach to overcome this problem is to use multi-homed (multi-radio) nodes, with radio transceivers tuned to orthogonal channels. Multi-homed nodes have significantly increased capacity, due to reduced interference and the ability to perform full-duplex communication, which is not supported by single-radio nodes.

A number of reactive routing protocols have been proposed, which are able to effectively discover routes in multi-radio wireless networks. Some of these protocols also support the discovery of multiple paths between node pairs. The most prominent examples of reactive routing protocols are Ad-hoc On-demand Distance Vector (AODV) and Dynamic Source Routing (DSR). Reactive protocols establish a route between a source and a destination by broadcasting a Route Request packet in the network. The final destination or any other node with a valid and fresh route to the destination replies with a Route Reply packet which is sent back to the source via unicast.

In the case of AODV, intermediary nodes remember these routes by creating routing table entries when these packets are forwarded. When Route Request packets are forwarded, reverse routes are created by creating a temporary routing table entry, associating the source address of the Route Request packet with the interface it was received on. When the corresponding Route Reply packets traverse back to the source, intermediary nodes create the corresponding forward routes, consisting of a routing table entry associating the source address of the Route Reply with the interface it was received on.

DSR also uses a similar mechanism but uses source routing whereby information regarding the entire path is added to each packet at the source. This information is collected during the Route Request flooding and added in the Route Reply packet. Similar flooding-based route discovery mechanisms are used by most reactive routing protocols.

None of the existing reactive routing protocols provides a mechanism for discovering all the available links between node pairs. Only a single link between two neighbor nodes is discovered. In case a link of an established route breaks, these protocols re-establish the route from scratch or at least trigger some repair mechanism that involves partial discovery of a new route, requiring the dissemination of routing packets in the network. Similarly, if a link gets congested due to local interference or increased traffic load, existing protocols do not offer an alternative way to resolve the problem locally and in real-time.

Routing protocols used in wireless multi-hop networks perform single path or multi path routing. In the former case, a single path is created between the source and the destination, while in the latter multiple node-disjoint or link-disjoint paths are created between the source and the destination. In node disjoint paths there are no common nodes. Each path is formed using distinct nodes. In link disjoint paths, there may be a common node involved but there are no common links between any two nodes used in two different paths.

Current reactive routing protocols do not take into consideration the multi-homed nature of the nodes and thus connectivity between adjacent nodes is generally maintained via single links only. Therefore, these protocols are not able to take full advantage of the link redundancy offered by multi-homed nodes. For example, they are not able to dynamically redirect or load-balance traffic between two adjacent nodes over all the available links. The only way in which current protocols can adapt to changes in the network and link conditions is by initiating a new complete or partial route discovery process, which is time consuming and incurs a significant overhead in the network.

Reactive routing protocols used in wireless multi-hop networks establish on-demand routes between source and destination pairs across multiple hops in a potentially very dynamic environment. None of these protocols provide support for discovering multiple links between adjacent nodes. Instead, these protocols normally make use of a single link between adjacent nodes, which are a part of an existing route.

The U.S. Pat. No. 7,065,376 discusses the establishment of a multi-radio unification protocol (MUP). The MUP presents multiple physical MAC addresses as a single virtual MAC address to the higher layers. The MUP multiplexes the packets from the higher layers on the appropriate network interface. Neighbor discovery is carried out using the standard Address Resolution Protocol (ARP), which informs nodes regarding the possible MAC addresses through which an adjacent node is accessible. Nodes broadcast an ARP request, asking the node with the given IP address to reply with its MAC address. If the node with the given IP address has multiple interfaces, each interface that receives a request will send an ARP reply, which allows the recipient to learn about its multiple links to that node. However, this method requires prior knowledge of the nodes and their IP addresses that a node wants to communicate with. This is an assumption which does not hold for ad-hoc and wireless mesh networks, which are typically highly dynamic. MUP is primarily applicable to static wireless multi-hop networks.

MUP further provides the option for switching between the interfaces based upon the local channel interference. In MUP the discovery of multiple concurrent bidirectional links to an adjacent node is carried out at the MAC layer using a single instance of the ARP.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY OF THE INVENTION

According to a first aspect the present invention provides a protocol for discovering bi-directional links during route establishment using a reactive routing protocol in a multi-hop wireless network, the protocol comprising:

each of a plurality of source and intermediate nodes transmitting a route request, at least one such node transmitting the route request on a plurality of wireless interfaces;

upon receiving a route request, each node creating at least one reverse link to the node from which the route request was received;

each of a plurality of destination and intermediate nodes transmitting, via at least one of the reverse links, at least one route reply which enables a node receiving the route reply to identify one or more wireless interfaces of the node transmitting the route reply; and upon receiving a route reply, each node creating at least one forward link to the node from which the route reply was received.

According to a second aspect the present invention provides a wireless network node operable in accordance with the protocol.

According to a third aspect the present invention provides a computer program product comprising computer program code means to make a wireless network node execute the protocol.

In a preferred embodiment of the invention the route reply is transmitted on a plurality of wireless interfaces.

In further preferred embodiments of the invention the route reply is transmitted on all wireless interfaces of the node.

In some embodiments of the invention, the route reply is transmitted on a subset of wireless interfaces of the node, and contains data identifying all available wireless interfaces of the node.

In some embodiments of the invention, a node associates a plurality of links with a single adjacent node by reference to the IP address of the adjacent node. Alternatively or additionally, a node may associate a plurality of links with a single adjacent node by reference to a node identifier included in the route request or route reply.

In embodiments of the invention, multiple links between a pair of adjacent nodes may be exploited for at least one of: local link repairing, channel optimisation, load balancing, and multi-linking.

The network may be a wireless mesh network.

BRIEF DESCRIPTION OF THE DRAWINGS

An example of the invention will now be described with reference to the accompanying drawings, in which.

DESCRIPTION OF THE PREFERRED EMBODIMENTS

The present invention recognizes that nodes in wireless multi-hop networks, and specifically in ad-hoc and mesh networks, are increasingly being equipped with multiple wireless network interfaces (radios) operating on orthogonal channels to achieve better utilization of the frequency spectrum. In addition to reducing interference via increased channel diversity, these additional interfaces can be used to create multiple concurrent links between adjacent nodes, i.e. nodes within single-hop range of each other.

Information about the availability of multiple links between nodes provides the opportunity to increase the overall performance of the network by optimally balancing traffic between the set of available inter-node links. This optimization can be done locally (independent of routing) and in near real-time, which provides the opportunity for dynamic adaptation to variations of system parameters such as channel capacity, interference, traffic load etc. The result is a more efficient use of the wireless medium and therefore an increased Quality of Service of the network. Furthermore, local knowledge of the availability of multiple inter-node links combined with the ability to dynamically adapt inter-node traffic flows can increase the network's resilience to failure and/or attack.

The present embodiment of the invention provides for discovery of the set of available bi-directional links between adjacent nodes in wireless multi-hop networks. This discovery process is integrated with the route establishment process of reactive routing protocols, and therefore achieves a high level of efficiency by incurring only minimal overhead. The discovery mechanism is applicable to a wide range of wireless multi-hop networks, including highly heterogeneous networks with an arbitrary combination of single radio/multi-radio and static/mobile nodes. Furthermore, in this embodiment the mechanism operates at the network layer and is independent of the physical and link layer, and can therefore support any type of network interface (or radio).

Providing nodes with information about the complete set of links shared with each immediate neighbor allows for resolution of these problems locally, without involving an expensive route discovery process. In this case, traffic between two adjacent nodes can simply be redirected to an alternative link that is operational and/or less congested.

Figure 1:
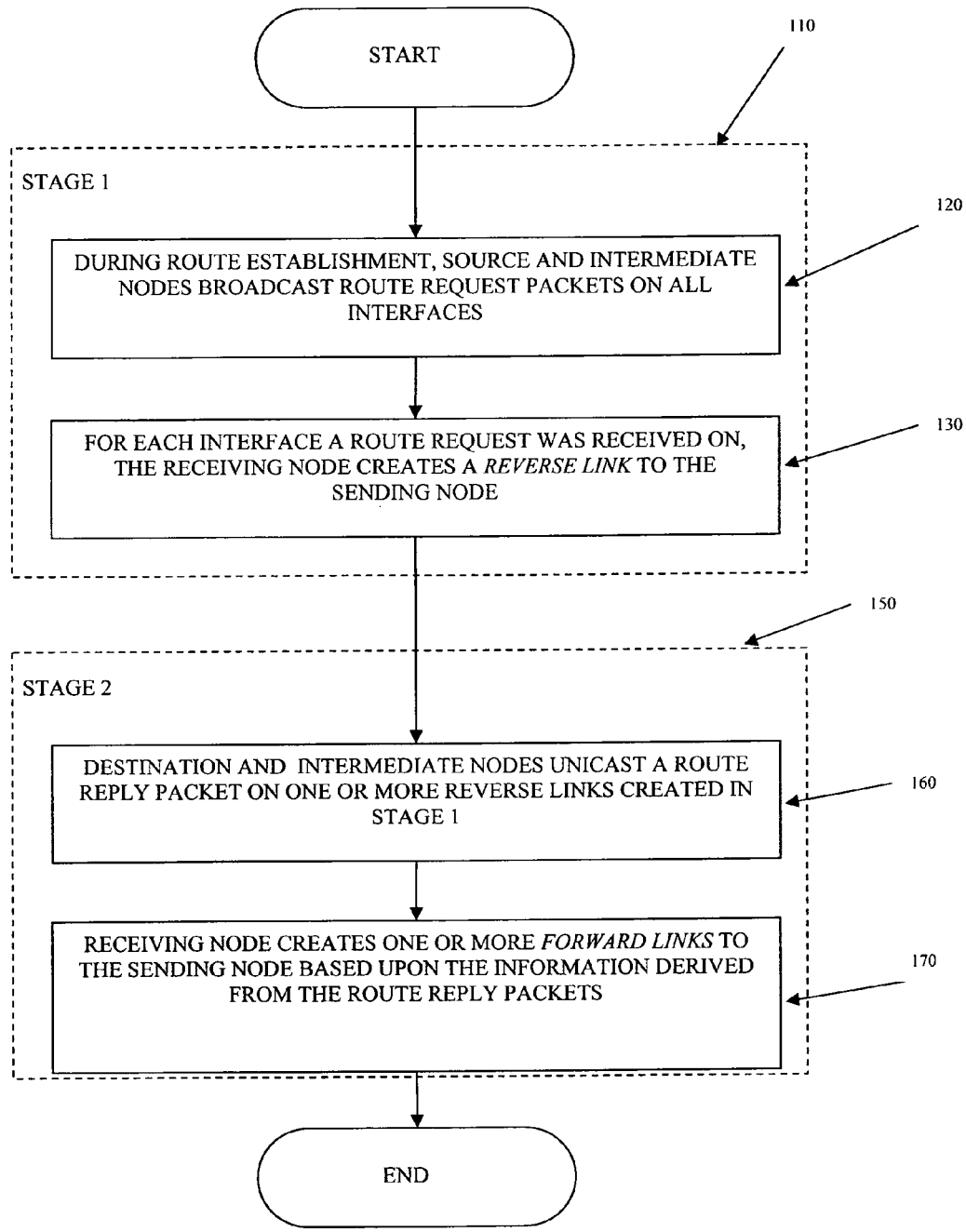
FIG. 1 illustrates the discovery of multiple bi-directional links by a protocol in accordance with one embodiment of the invention.

The embodiment of the invention described herein enables multi-homed nodes to discover multiple concurrent bi-directional links between each other during the route establishment process of a reactive routing protocol. The discovery is done in two stages, as shown in FIG. 1.

The first stage 110 of the protocol 100 is carried out when a source node floods the network with a Route Request packet in order to discover a route to the destination node. At 120, the source node broadcasts a Route Request packet on all its interfaces. Similarly, all intermediary nodes which receive the same Route Request packet rebroadcast the Route Request packet on all of their network interfaces. Depending upon the communication range, channel assignment, collisions or other factors, the destination or intermediate nodes may receive the Route Request packet on one or more wireless interfaces. At 130, nodes that receive the Route Request packet create a temporary reverse link to the adjacent node from which the Route Request packet was received. A reverse link may consist of an entry in a neighbor routing or link table, consisting of the identifier (e.g. IP address) of the adjacent node and the corresponding local network interface via which it can be reached.

Separate reverse links are established for each interface on which a Route Request Packet was received. This is in contrast to other reactive routing protocols which only establish a single reverse link, required for the establishment of a single reverse route. Asymmetric or unidirectional links are not uncommon in wireless networks. Therefore, reverse links created when a Route Request is received represent only unidirectional connectivity from the sender of the Route Request to the recipient. At this stage, the connectivity in the reverse direction has not yet been verified.

A question that arises in this context is how nodes differentiate between Route Request (or Reply) packets received from different nodes, and Route Request (or Reply) packets received from multiple interfaces of a single node. In accordance with the present invention, one or more of a number of solutions to this problem may be applied. In some embodiments, all interfaces of a node are configured to use the same IP address. In alternative embodiments, node identifiers other than the IP address can be added to the Route Request and Route Reply packets, to determine which packets originate from the same node.

The second stage 150 of the discovery process is carried out when the destination node, or any intermediary node that has a current route to the destination, responds at 160 to each Route Request packet received on a different interface with one or more Route Reply packets. The Route Reply is sent to the source of the Route Request using the reverse links created in Stage 1 at 110.

When a Route Reply arrives at a node (intermediary or source), bidirectional connectivity is established to the node sending the Route Reply packet, at 170. Successful transmission in both directions of a link is required for a Route Request to be sent and the corresponding Route Reply to find its way back. At this stage, the corresponding entry for this link in the neighbor routing or link table is marked as established.

In alternative embodiments, instead of sending a Route Reply via all interfaces, a destination node could reply to a Route Request with a single Route Reply sent via a single interface only. In this case, the Route Reply needs to contain information about all the node's interfaces to allow receiving nodes to figure out which common links (e.g. channels) they share. At the end of the two stage (110 and 150) discovery process 100, all nodes involved in the route establishment have complete information about the available bidirectional links to their immediate neighbor nodes.

Figure 2:
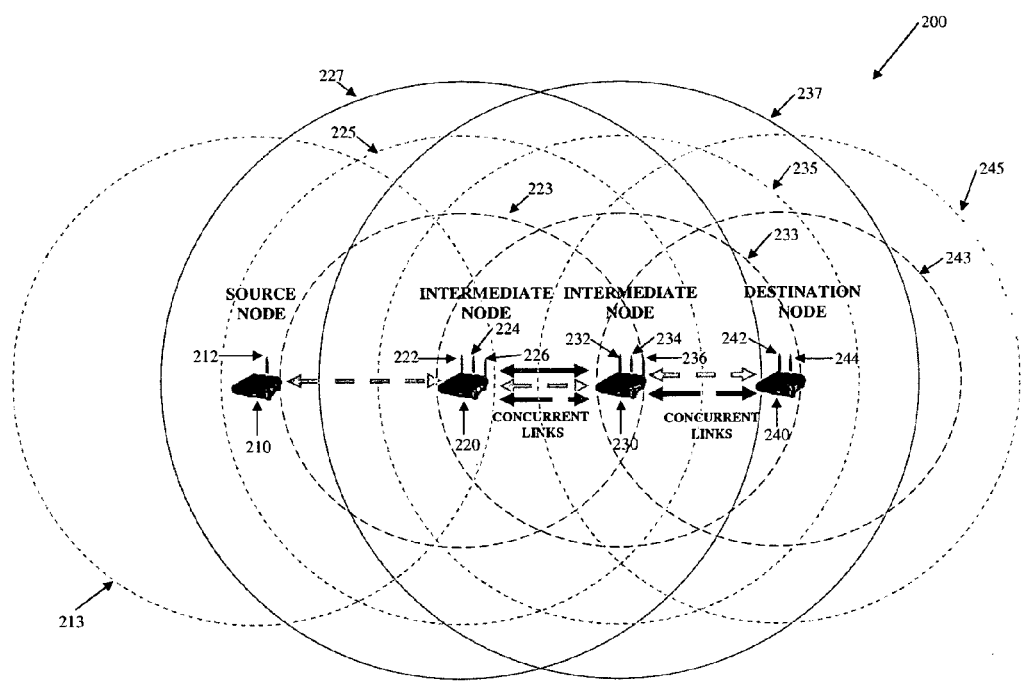
FIG. 2 illustrates a wireless mesh network comprising nodes having one or more wireless interfaces, in which the protocol of the present invention may be applied.

FIG. 2 illustrates application of the protocol to a mesh network 200, showing the ranges of the individual radio interfaces as concentric circles. The source node 210 on the left is single-homed (having a single interface 212, with range 213) and is hence only able to create a single bidirectional link with its adjacent node 220. The other nodes 220, 230, 240 are multi-homed and by using the protocol of the present invention, are able to discover multiple concurrent links to their immediate neighbors during the route establishment process of the reactive routing protocol. In more detail, node 220 has three wireless interfaces 222, 224 and 226, having respective ranges illustrated at 223, 225 and 227. Similarly node 230 has three wireless interfaces 232, 234 and 236 having respective ranges, illustrated at 233, 235 and 237. Finally, node 240 has two wireless interfaces 242 and 244, having respective ranges illustrated at 243 and 245. These additional links, once established, can subsequently be used for a variety of purposes, including local link repairing, channel optimisation, load-balancing and multi-linking between adjacent nodes in near real-time, without involving any expensive route establishment or repair mechanisms.

The embodiment of the invention described here is applicable to static and dynamic wireless multi-hop networks such as mobile ad-hoc and wireless mesh networks. However, the invention is equally applicable to other types of wireless multi-hop networks, including sensor and actuator networks which make use of multiple radios per node and reactive (flooding based) routing protocols.

In an alternative embodiment of the invention, destination nodes reply with only a single Route Reply packet via a single network interface. To provide information about all the links to neighbors, the Route Reply contains information about all the interfaces (type, band, channel, etc.) of the sending or forwarding node. From this information, a node that receives a Route Reply can deduce its links to the sender. This alternative approach has the benefit of incurring less overhead in the network, but it has some limitations. If node A sends a Route Request to node B via all its interfaces, node B will reply with a single Route Reply containing information about all the interfaces the Route Request from A has been received on. However, in case of unidirectional links, it is not guaranteed that there is connectivity from A to B via the interfaces other than the one the Route Reply was actually sent on. Nevertheless such embodiments may be of value in some applications.

The present protocol for discovering multiple parallel links between nodes has a number of applications for optimising multi-hop multi-radio wireless networks, including:

Link Repairing: In case a link between two adjacent nodes breaks, current reactive routing protocols generate a Route Error and a new route discovery is triggered either by the node observing the link breakage or the source node. However, the present invention makes it possible to retain multiple concurrent connections between adjacent nodes, so that a node observing a link breakage to an adjacent node can simply switch to an alternate link, without initiating route maintenance or discovery.

Link Optimisation: The availability of concurrent bidirectional links between adjacent nodes permits effective channel optimisation. For example, interference on a path can be minimised by selecting links between nodes that have the least level of interference with upstream or downstream links, i.e. channel diversity can be increased. For example if it is observed that the performance of a particular link is deteriorating due to increased interference, the node can switch to an alternative link with lower interference, thereby increasing the quality of service of the network.

Load-Balancing: The availability of multiple concurrent bidirectional links also has a great potential for load-balancing. For example, if a node is unable to sustain the traffic flow on one of its links due to congestion, it can shift some of the load onto another parallel link in real-time.

Multi-Linking: Striping can be performed at the application layer, transport layer or the routing layer and allows traffic to be sent simultaneously on all multiple links. The invention described here permits the creation of a high capacity virtual link between two adjacent nodes.

The present embodiment of the invention allows this integration of the discovery of the complete set of links between neighboring nodes with the route discovery of a reactive routing protocol.

Unlike MUP the embodiment of the invention disclosed here discovers multiple concurrent bidirectional links over multiple hops at the network layer using a single instance of the route establishment process, and further is applicable to any static/mobile wireless multi-hop network. Thus, the embodiment disclosed here describes a method for discovering multiple concurrent bidirectional links between multi-homed adjacent nodes in a wireless multi-hop network, with tight integration with the route discovery process of reactive routing protocols, resulting in a low overhead solution.

The invention has been simulated based on AODV (Ad-hoc On Demand Distance Vector), which is the dominant reactive ad-hoc network routing protocol. The modified protocol in accordance with the present invention has been evaluated using CMU's Network Simulator (NS-2) under diverse node-configurations, mobility and traffic patterns. The results of the simulations show significant improvement over the standard routing protocol (AODV) in multi-radio wireless mesh networks. The first version of our simulation already showed a higher than 100% improvement in throughput over standard AODV. The present invention may in other embodiments also be applied to other reactive routing protocols, such as DSR for example.

The present invention can be applied to a wide range of wireless multi-hop networks that include multi-homed nodes, including mobile ad-hoc networks, sensor networks and wireless mesh networks. The most likely application is for wireless mesh networks, due to the fact that nodes in these networks are less resource constrained and more likely to be equipped with multiple network interfaces. Wireless mesh networks represent a rapidly growing market segment, with a wide range of applications including public safety and first responder communication, intelligent transportation systems, community networks, home automation and many more.

Embodiments of the present invention may thus provide an important mechanism for significantly improving the performance of wireless multi-hop networks with multi-homed nodes and reactive routing protocols.

The present invention may alternatively be embodied as a wireless mesh network product, based on commercial off-the shelf hardware and open source software (such as Linux).

The present invention thus provides a mechanism for discovering multiple wireless links between node pairs integrated with the route discovery mechanism of a reactive routing protocols. The present invention thus recognises that the discovery of routes, each being an ordered set of nodes, is a separate issue to the discovery of multiple links between node pairs. The present invention thus provides for discovery of multiple links between node pairs of a route as a part of route discovery of a reactive routing protocol. Embodiments of the present invention may thus be applied to the establishment of a single route or to establishment of multiple routes, and in particular may be used to extend existing reactive ad-hoc multi-path routing algorithms. Embodiments of the present invention may minimise co-channel interference and lower routing overhead, latency and buffer requirements by exploiting the availability of multiple links via mechanisms such as local link repairing, link load balancing or link bonding, in turn permitting increased capacity and/or robustness.

It will be appreciated by persons skilled in the art that numerous variations and/or modifications may be made to the invention as shown in the specific embodiments without departing from the scope of the invention as broadly described. The present embodiments are, therefore, to be considered in all respects as illustrative and not restrictive.

The invention claimed is:

1. A method for discovering bi-directional links during route establishment via a reactive routing protocol in a multi-hop wireless network, the method comprising:
   a plurality of source and intermediate nodes transmitting a route request to an adjacent node on a plurality of wireless interfaces;
   upon receiving a route request on at least two wireless interfaces, each node receiving the route request creating at least one reverse link to the node from which the route request was received, each reverse link consisting of one of the at least two wireless interfaces of the node receiving the route request;
   each of a plurality of destination and intermediate nodes transmitting, via at least one of the reverse links, at least one route reply which enables a node receiving the route reply to identify at least two wireless interfaces of the node transmitting the route reply; and
   upon receiving a route reply, each node identifying the two or more wireless interfaces of the node transmitting the route reply and creating at least two forward links to the node from which the route reply was received, each of the at least two forward links consisting of one of the two or more identified wireless interfaces of the node transmitting the route reply.

2. The method of claim 1 wherein the route reply is transmitted to an adjacent node on a plurality of wireless interfaces.

3. The method of claim 2 wherein the route reply is transmitted to an adjacent node on all wireless interfaces.

4. The method of claim 1 wherein the route reply is transmitted to an adjacent node on a subset of wireless interfaces of the node, and contains data identifying all available wireless interfaces.

5. The method of claim 1 wherein a node associates a plurality of links with a single adjacent node by reference to the IP address of the adjacent node.

6. The method of claim 1 wherein a node associates a plurality of links with a single adjacent node by reference to a node identifier included in the route request and/or route reply.

7. The method of claim 1 further comprising exploiting multiple links between a pair of adjacent nodes for at least one of: local link repairing, channel optimization, load balancing, and multi-linking.

8. The method of claim 1 wherein the network is a wireless mesh network.

9. A wireless mesh network node operable in accordance with the method of claim 1.

10. A computer program product comprising computer program code means to make a wireless network node execute the method of claim 1.

11. The method of claim 1 wherein two or more nodes transmit the route request to respective adjacent nodes.

* * * * *